US011973585B2

(12) United States Patent
Reynolds et al.

(10) Patent No.: US 11,973,585 B2
(45) Date of Patent: Apr. 30, 2024

(54) PORTABLE ELECTROMAGNETIC COUNTERMEASURE DEVICE

(71) Applicant: COMBAT BOUND LLC, Virginia Beach, VA (US)

(72) Inventors: Emil Reynolds, Suffolk, VA (US); Raul Washington John Donoso, Jr., Bellevue, WA (US)

( * ) Notice: Subject to any disclaimer, the term of this patent is extended or adjusted under 35 U.S.C. 154(b) by 157 days.

(21) Appl. No.: 17/758,081

(22) PCT Filed: Dec. 14, 2021

(86) PCT No.: PCT/US2021/072898
§ 371 (c)(1),
(2) Date: Jun. 28, 2022

(87) PCT Pub. No.: WO2023/113837
PCT Pub. Date: Jun. 22, 2023

(65) Prior Publication Data
US 2023/0188243 A1 Jun. 15, 2023

(51) Int. Cl.
*H04K 3/00* (2006.01)
*H01Q 1/27* (2006.01)

(52) U.S. Cl.
CPC ............. *H04K 3/825* (2013.01); *H01Q 1/273* (2013.01); *H04K 3/44* (2013.01)

(58) Field of Classification Search
CPC ........... H04K 3/825; H04K 3/44; H01Q 1/273
See application file for complete search history.

(56) References Cited

U.S. PATENT DOCUMENTS

| | | | | |
|---|---|---|---|---|
| 7,512,511 | B1 | 3/2009 | Schultz et al. | |
| 9,860,015 | B2 | 1/2018 | Charland | |
| 10,969,467 | B1 * | 4/2021 | Dunn .................... | H04W 12/79 |
| 2006/0012508 | A1 | 1/2006 | Messano | |
| 2013/0308732 | A1 | 11/2013 | Kpodzo et al. | |

(Continued)

OTHER PUBLICATIONS

Zhao et al., "A Design of Portable Radar Broadband Jamming and Decoy Signal Generator", ScienceDirect, 2021, retrieved on [Jun. 21, 2022]. Retrieved from the Internet <URL: https://www.sciencedirect.com/science/article/pii/S1877705812000471> entire document.

*Primary Examiner* — Junpeng Chen
(74) *Attorney, Agent, or Firm* — Carson Patents; Gregory D Carson

(57) ABSTRACT

A portable Electromagnetic Countermeasure (ECM) device is disclosed for military and civilian population protection from electromagnetic communications and attack, including cell phones, radios, radio-triggered explosive devices, and other personal and portable devices comprising transmitters and receivers. The portable ECM device is usable by a person such as a soldier or policeman to protect themselves and other people around them from spy, guerrilla, military and terrorist threats. The portable (ECM) device comprises a first antenna and a second antenna, both to communicate radio signals with a software defined radio (SDR), and a control pack having a microprocessor operable by remote network connection, or by a mode selector on board the device, to control the SDR according to a mode selected, to receive, produce, and classify radio signals.

13 Claims, 9 Drawing Sheets

(56) References Cited

U.S. PATENT DOCUMENTS

| | | | | |
|---|---|---|---|---|
| 2015/0229434 | A1* | 8/2015 | Shawn | G01S 13/74 342/14 |
| 2017/0094527 | A1* | 3/2017 | Shattil | H04K 3/92 |
| 2017/0352963 | A1 | 12/2017 | Hurzon | |
| 2020/0108926 | A1 | 4/2020 | Smith et al. | |
| 2022/0077879 | A1* | 3/2022 | Husain | G06N 5/022 |

* cited by examiner

PORTABLE ELECTROMAGNETIC COUNTERMEASURE DEVICE

TECHNICAL FIELD OF THE INVENTION

A portable Electromagnetic Countermeasure (ECM) device is used in the field of military and civilian protection from electromagnetic communications, sensing, and attack, including cell phone communication and radio communications. More specifically, the portable ECM device is in the field of personal devices useable by a person, such as a soldier or policeman, to protect themselves and other people around them. The ECM device uses defensive and disruptive electromagnetic countermeasures against spy, guerrilla, military and terrorist threats posed by their radio-triggered explosive devices, electromagnetic communications, and electromagnetic devices.

BACKGROUND

Operations by soldiers and police are susceptible to surveillance and attack by adversaries using cell phones and radios. Adversaries use their cell phones to spy and report on soldiers and police and to operate weapons against them. Adversaries also use their cell phone and radios to communicate with each other and coordinate attacks. Adversaries also use cell phones to remotely detonate improvised explosive devices (IEDs) and harm the soldiers, police and local people around them.

In the past, military commanders and civilian authorities have taken over city wide and country wide cell phone networks and radio broadcasters to monitor and neutralize enemy spies, guerrillas and terrorists. However soldiers, policemen, and civilians in a specific location can still be vulnerable.

Soldiers, policemen, and civil authorities require a compact, unobtrusive, and flexible capability that they can operate to intercept, co-opt, or prevent local cell phone and radio communications to protect the people around them and themselves.

BRIEF SUMMARY OF THE INVENTION

A first aspect of the invention is a portable electromagnetic countermeasure (ECM) device for classifying and neutralizing electromagnetic devices around the user. The portable ECM device comprises: a first antenna, a second antenna, and/or a third antenna, each to communicate radio signals with a software defined radio (SDR), and a control pack having a microprocessor operable by remote network connection, or by a mode selector on board the device, to control the SDR according to a mode selected, to receive, produce, and classify radio signals. The personal ECM device protects a person and other locals by intercepting, raising alarms about, co-opting, or preventing local electromagnetic communications and sensing.

The portable ECM device may be a fully networked and network-reconfigurable Signal Intelligence (SIGINT) sensor/jammer. It may discreetly identify and collect hostile communications. It may automatically degrade and disrupt them. It may connect to tactical network platforms and user interfaces (such as Android Tactical Assault Kit), thereby supporting tactical officers at higher echelons conducting larger-scale electronic warfare operations.

A tactical officer could monitor an operator-worn portable ECM device to collect emissions from and estimate the location of an enemy emitter, upload a custom waveform to the portable ECM device for use against that particular enemy emitter, and "call for electronic fires" by directing a portable ECM device-equipped operator (or operators) to use a tool-mounted directional antenna to "fire for effect" by emitting that custom waveform against the target.

Sharing directional SIGINT also allows tactical network-coordinated kinetic fires. The portable ECM device may integrate omnidirectional sensing, directional sensing, direction finding, machine-learning signal classification, omnidirectional attack, and directional attack capability. The mode selector's multi-mode capability provides a portable ECM device-equipped soldier or police officer mission flexibility in combat operations, counterinsurgency and counter-IED scenarios, force protection, humanitarian assistance, law enforcement, and disaster relief missions.

The portable ECM device may be battery, solar, and/or vehicle powered, lightweight, and provide 360-degree capabilities to maintain utmost responsiveness in varied geographic terrains.

A portable ECM device equipped soldier, policeman, unmanned ground vehicle (UGV), or unmanned aircraft system (UAS) becomes a flexible and capable networked sensor/jammer (SIGINT) node expanding ECM capabilities across the force, improving situational awareness, and adding defensive and offensive electromagnetic spectrum operations (EMSO) capabilities to small units and individual operators using tactical networks.

Disclosure of the invention may also be found in the claims.

The invention will now be described, by way of example only, with reference to the accompanying figures in which:

DETAILED DESCRIPTION

Figure 1:
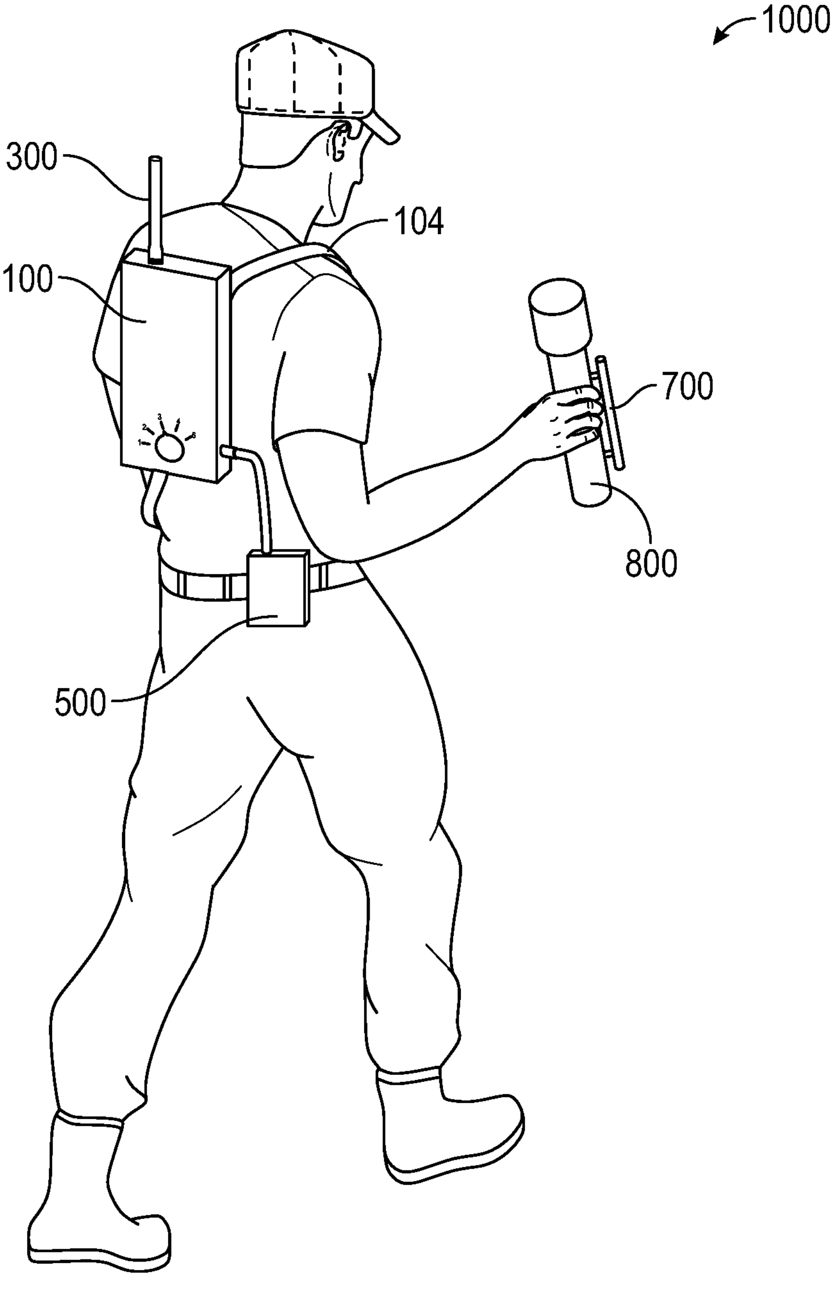
FIG. 1 shows a person carrying a portable electromagnetic countermeasure system comprising a portable control pack hooked up to an Omnidirectional Back-Mounted Direction Finding (DF) Antenna, a Body-Worn Antenna, and a Tool-Mount Antenna.
Figure 2:
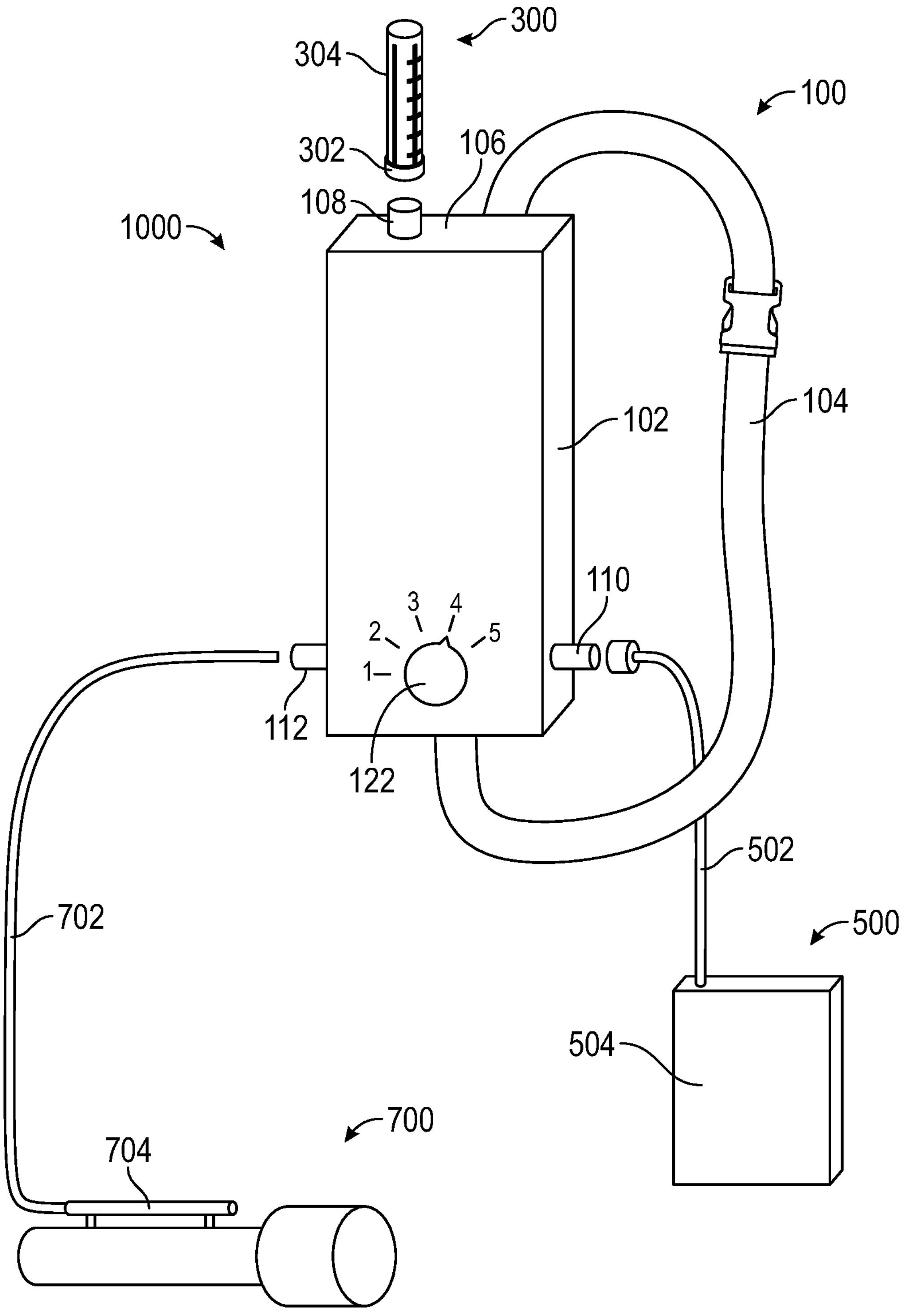
FIG. 2 shows a perspective view of a portable control pack configured to communicate radio signals with antennas.

A person carrying a personal ECM system 1000 is shown in FIG. 1. The parts of the personal electromagnetic counter measure (ECM) system 1000 are shown in FIG. 2. The personal ECM system includes a control pack 100 and at least one antenna 300, 500, 700.

Control Pack

As shown in FIG. 1 the control pack 100 is configured to be worn. The control pack 100 comprises a case 102 which is about hand sized and relatively thin compared to the length and width. A strap loop 104 attaches to the case. The case 102 can be attached to webbing, including PALS/MOLLE-type webbing. The strap loop 104 is slung over the user's shoulder. The strap loop 104 or webbing holds the control case to the user where an antenna attached to the case exterior is clear of the user's body and/or clothing. It is desirable to keep the body-worn antennas discrete, such that they can be unobtrusively sewn into or worn with normal civilian clothing if necessary. The default case, though, is body-worn antennas in uniform shoulder pockets. The antenna receives electromagnetic waves without them having to pass through the user's body. and the strap loop 104 holds case 102 on the user's back at the height of their shoulder blade.

Figure 3:
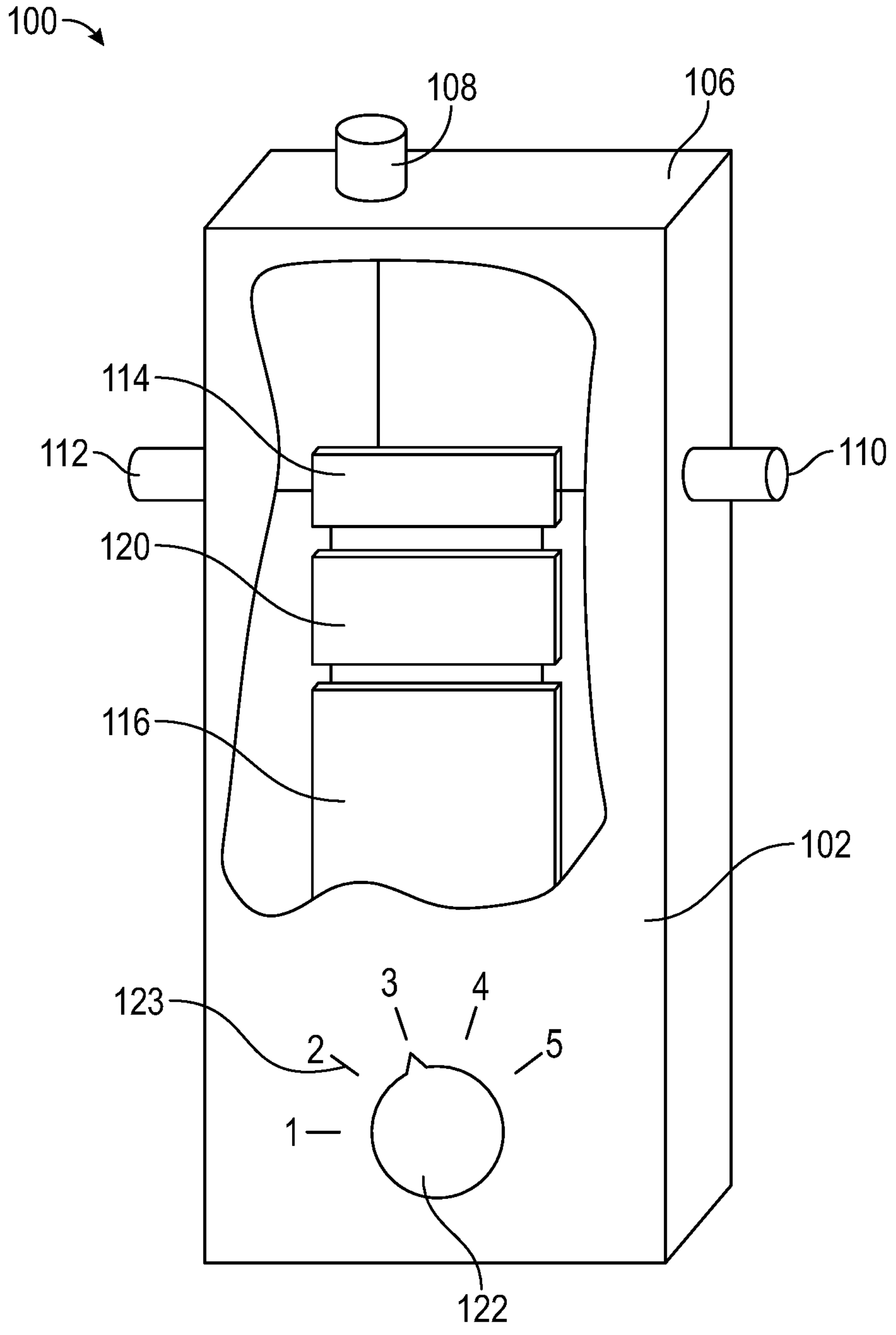
FIG. 3 shows a cut-away view of a portable control pack with amplifier system, SDR, and other components (detailed below by element number)

The control pack 100 is shown in detail in FIG. 3. An end 106 of the case 102 is intended to be held upward at shoulder level by the strap loop 104. On the end 106 there are antenna connectors 108. When worn, the shoulder strap 104 holds the antenna connectors 108 at about shoulder level. Other attachments to the case can hold the case at about shoulder level or elsewhere on the user's body, such as above their hat or on their arm, are possible to keep an antenna connected to the case in position to receive electromagnetic radiation directly without being obscured by the user's body or clothing.

FIG. 3 shows a cut-away view of components inside the case 102. An amplifier board 114 is electrically connected to the antenna connector 108. A second antenna connector 110 and a third antenna connector 112 on the sides of the case 102 are also electrically connected to the amplifier board 114. More antenna connectors on the case exterior are possible. There are seven antenna connections to the amplifier board and each one of these could be electrically connected to a shared antenna connector on the case exterior or to an unshared antenna connector on the case exterior.

There is a radio board 120 between the amplifier board 114 and a microcomputer board 116. The radio board 120 is controlled by software running on the microcomputer board 116.

Antenna Connectors

Figure 4:
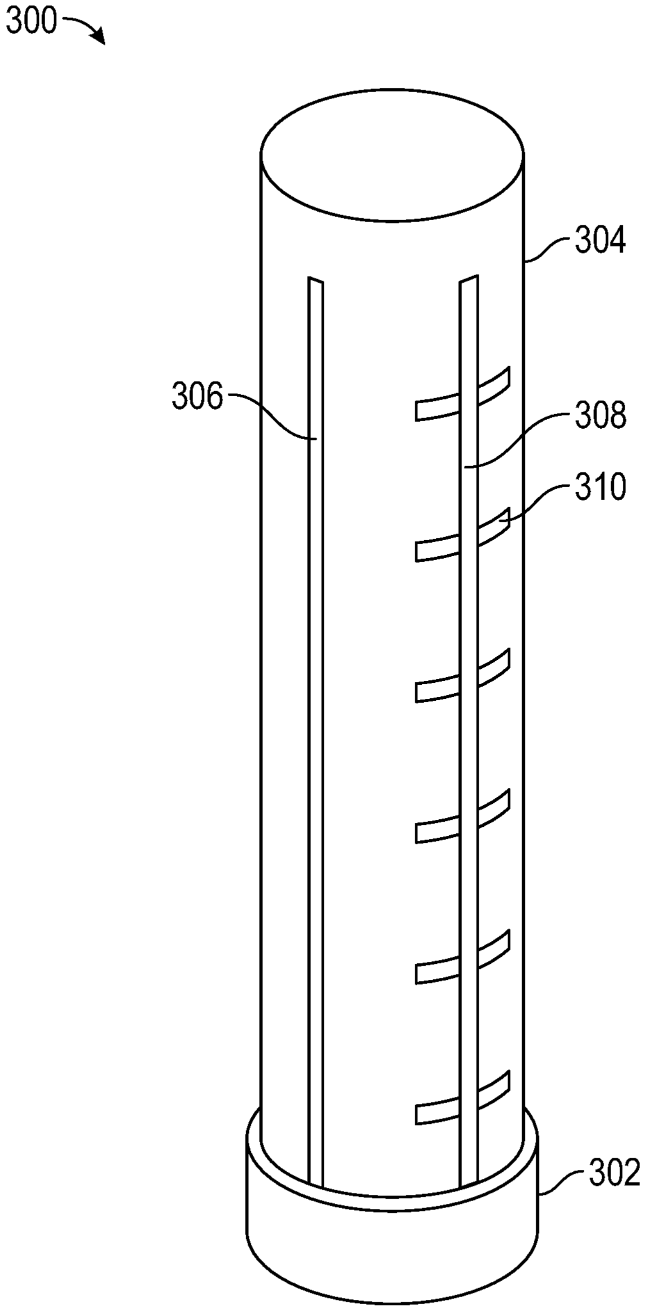
FIG. 4 shows a perspective view of an omnidirectional back-mounted direction finding (DF) antenna attachable to the control pack.

As shown in FIG. 4, the first antenna connector 108 connects to a connector 302 on an end of an elongated sheath 304 protecting antenna elements 306, 308, 310 of a connected omni back-mount direction finding (DF) antenna 300 above the user's shoulder level. Antenna elements of the direction-finding antenna in the sheath 304 are held above the shoulder (or head or arm or back or chest) and are clear of the user's body, so the antenna elements send and receive radio waves without interference from the user's body.

As shown in FIG. 3, on the case 102 there is a second antenna connector 110 to attach to an antenna signal cable 502 which connects to a body-worn antenna element 504. In some embodiments there are two or more body-worn antennas, for example one on each shoulder, to improve coverage. On the case 102 there is a third antenna connector 112 to attach to an antenna cable 702 which connects to a directable antenna element. It is not necessary that there be a second or third antenna connector as one antenna is sufficient. The second antenna connector 110 and the third antenna connector 112 are shown on the end 106 of the case 102, although this is not necessary.

Antennas

Figure 5:
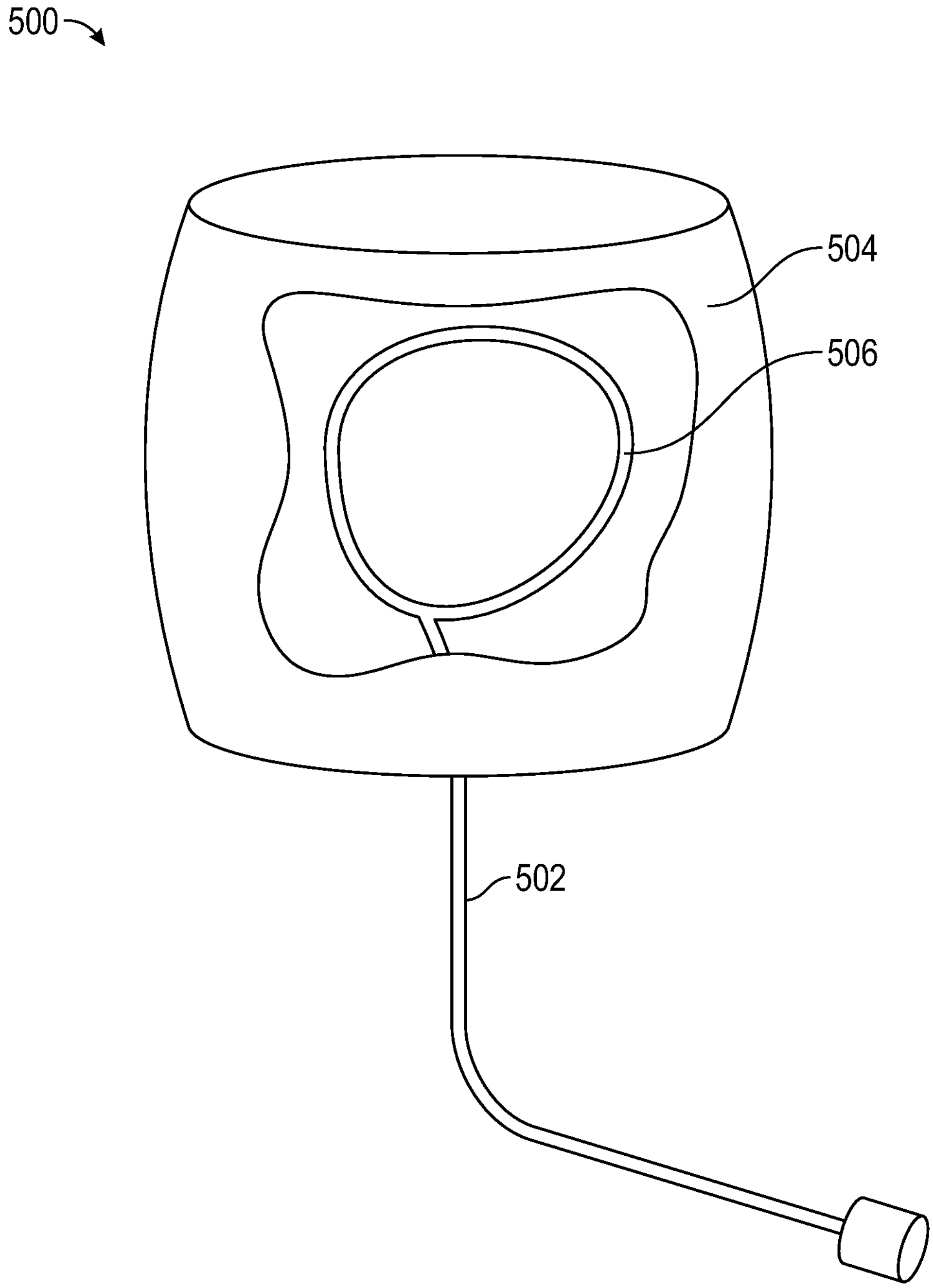
FIG. 5 shows a body-worn antenna connectable to the control pack by an antenna communication cable.
Figure 6A:
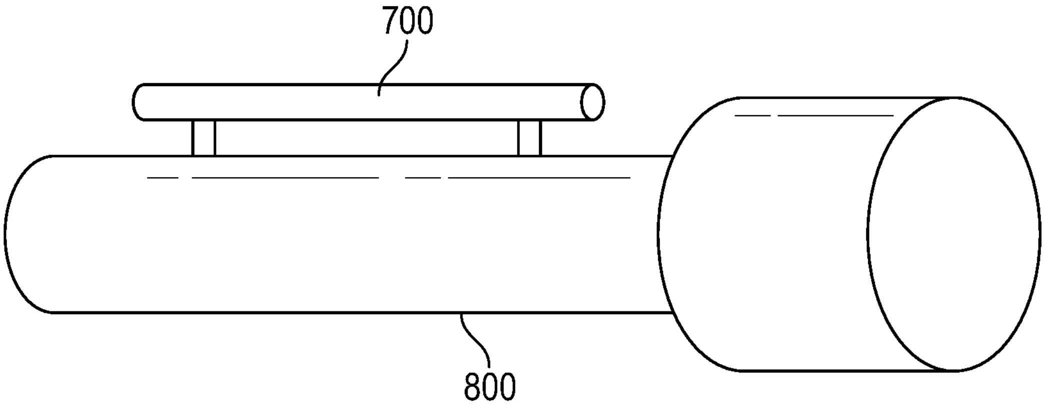
FIG. 6A shows a Tool-Mounted Antenna attachable to a directing tool which is a flashlight.
Figure 6B:
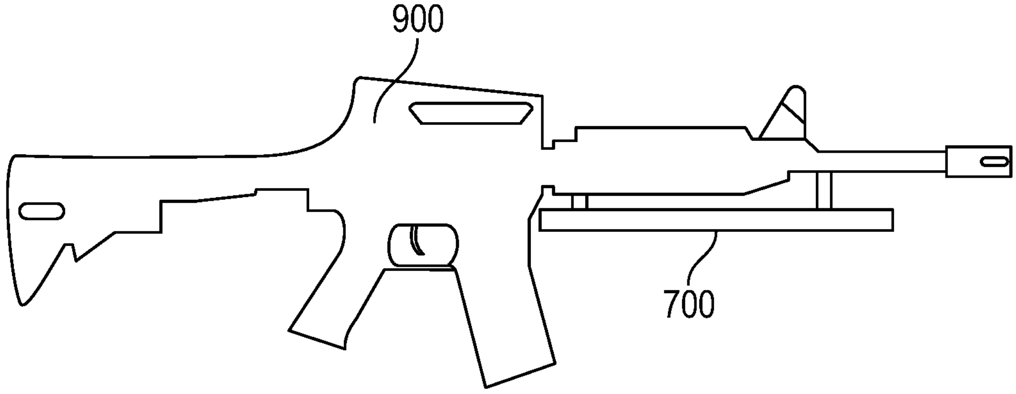
FIG. 6B shows a Tool-Mounted Antenna attachable to a directing tool which is a gun.
Figure 7:
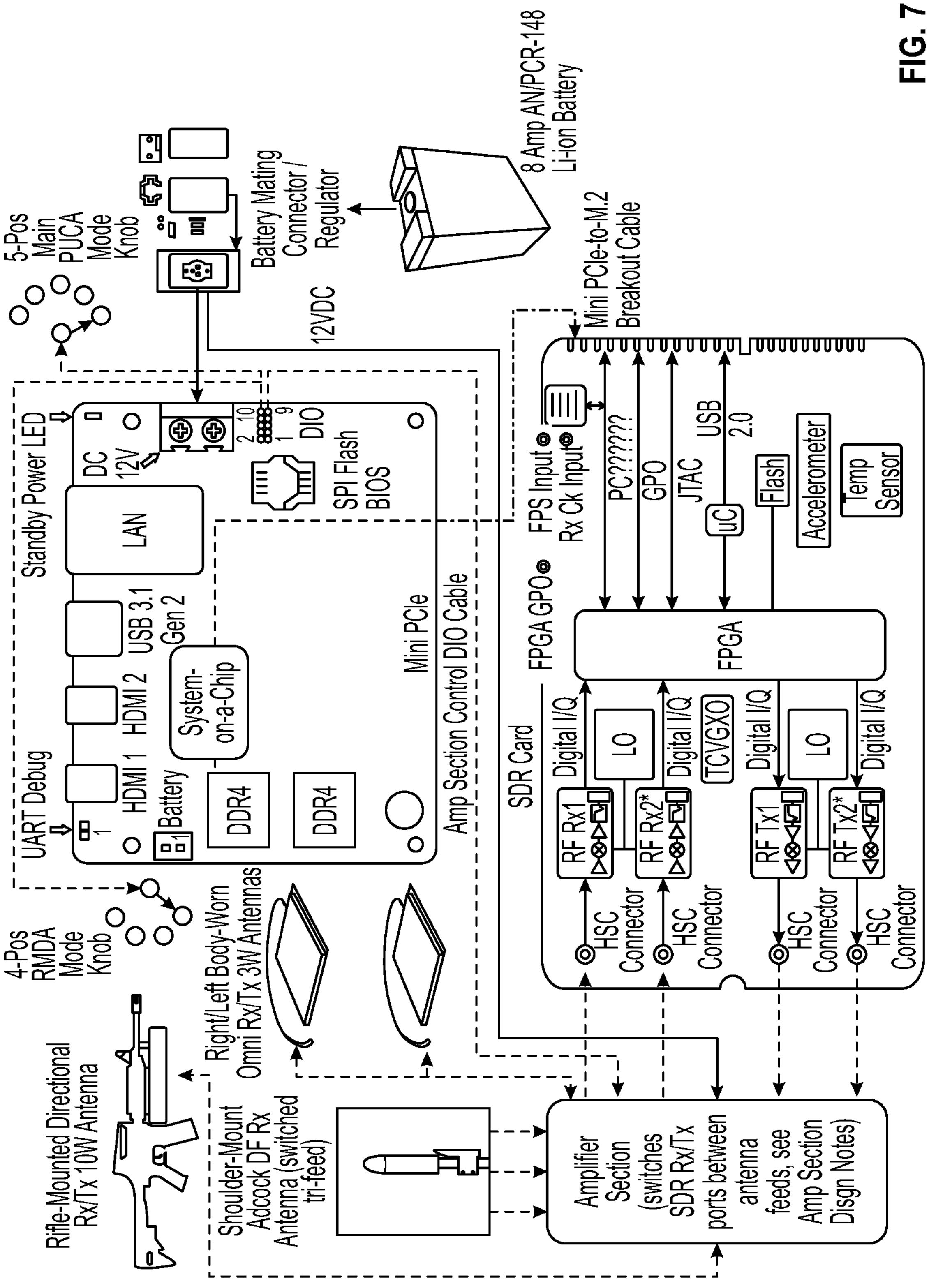
FIG. 7 shows a high level block diagram of the portable electromagnetic countermeasure system.
Figure 8:
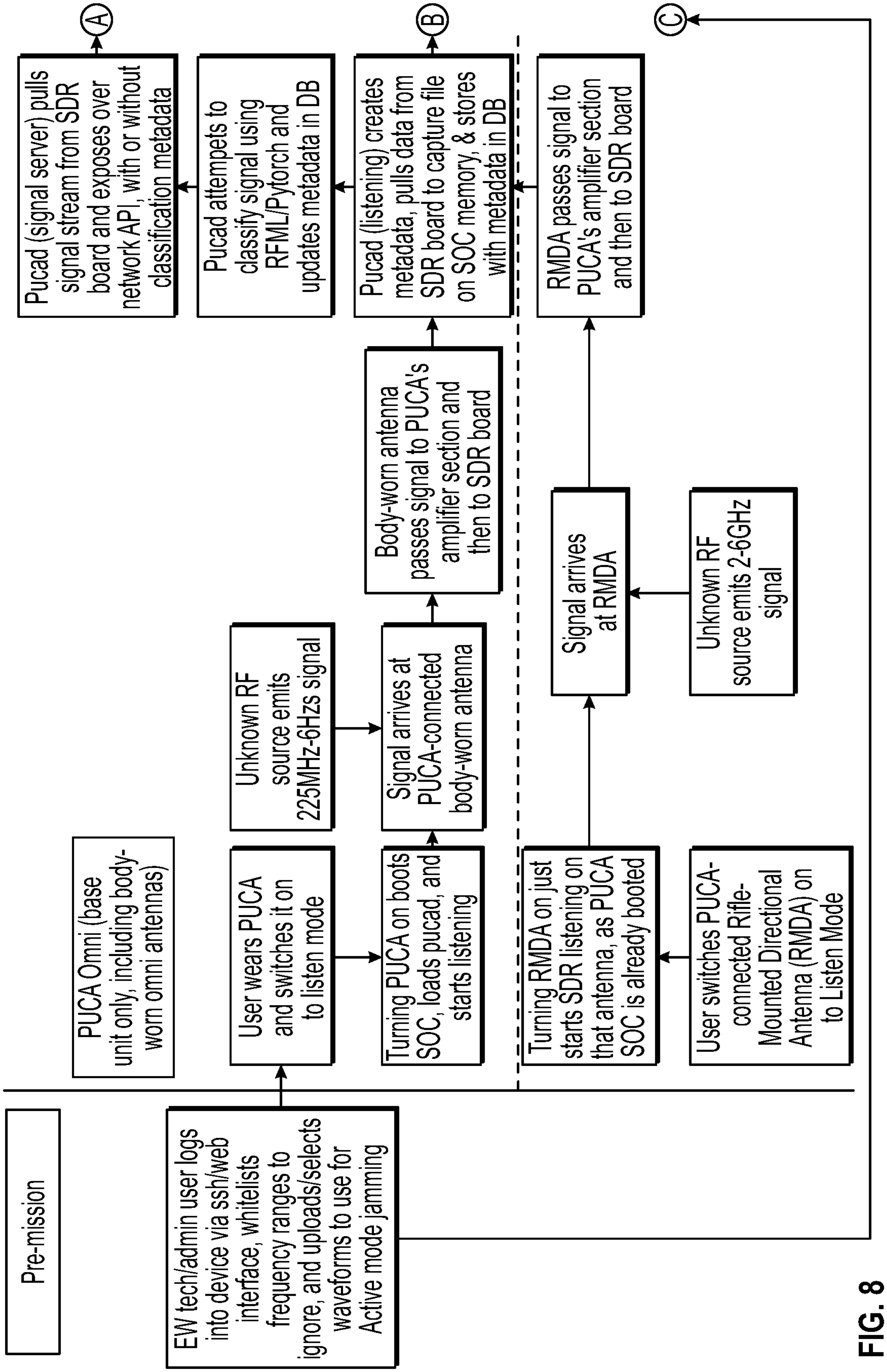
FIG. 8 shows a pre-mission flow chart of the portable electromagnetic countermeasure system operation.
Figure 9:
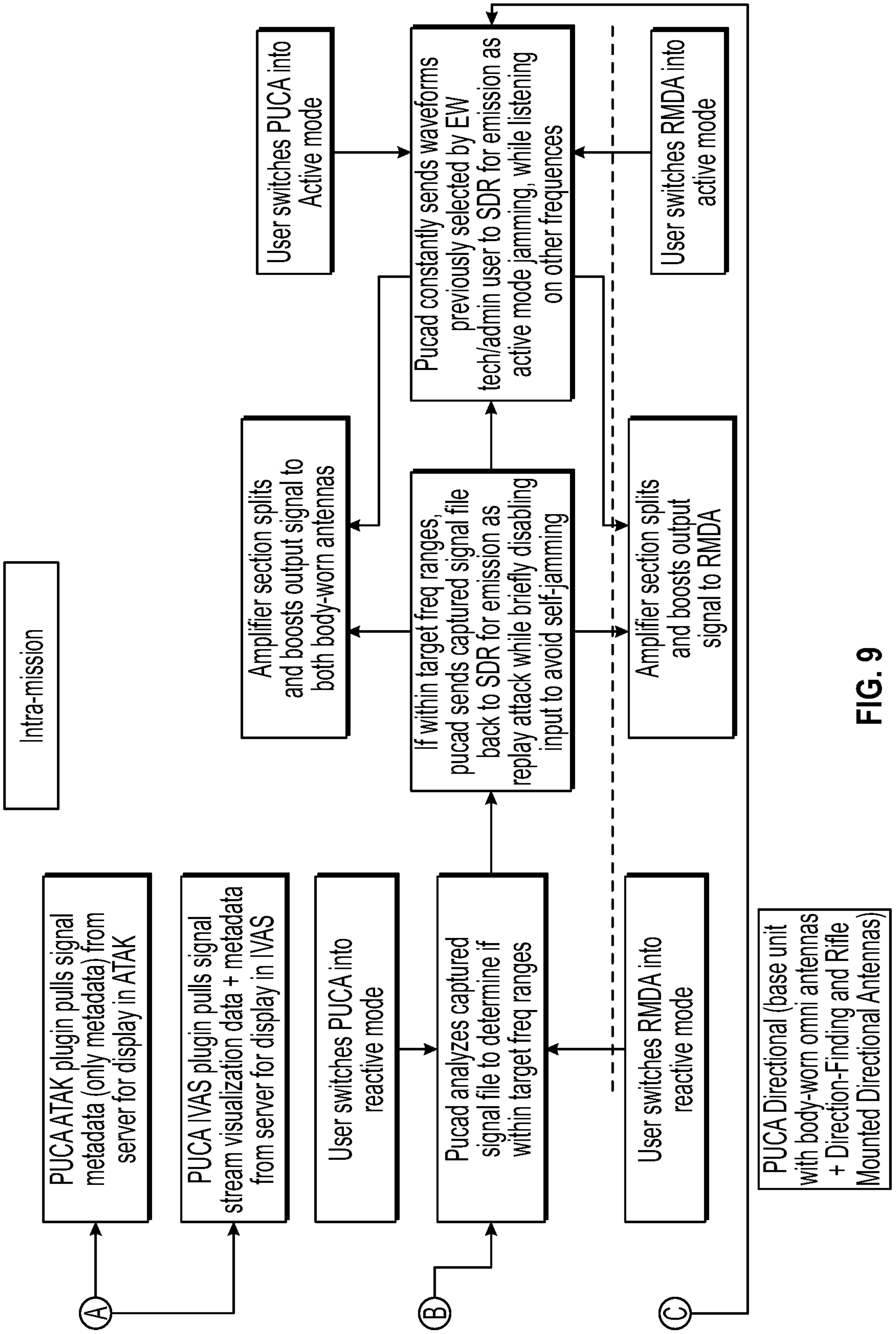
FIG. 9 shows an intra-mission flow chart of the portable electromagnetic countermeasure system operation.

Exemplar antennas are an omni back-mount DF antenna 300 as shown in FIG. 4, an omni body-worn antenna 500 as shown in FIG. 5, and a directable tool-mount antenna 700 as shown FIG. 6A and FIG. 6B. It is possible for the tool-mounted antenna to be integrated into the tool it's mounted to, for example integrated into the foregrip of the gun 900 or the barrel of the flashlight 800.

Ideal antennas include multiple electromagnetic radiation detection elements to determine the direction of a source of the radiation. The antennas are configured to detect and to radiate electromagnetic radiation in frequency bands used by civil cell phone networks and radio and TV communication networks such as '3G' '4G', '5G', 'CDM', 'GSM', 'VHF', 'UHF', 'Bluetooth, 'Wi-Fi' and 'CB', as well as military tactical radio networks and other kinds of radio systems. The antennas' operable total power output may be up to 100 W or higher.

Each of the antennas 300, 500, 700 may have more than one electromagnetic wave element. Each electromagnetic wave element may detect or broadcast its own signal. So there may be a plurality of signals for each antenna 300, 500, 700. The switches controlled by the signal processor 116 may selectively transmit or interrupt every signal individually. Omni Back-Mount Direction Finding (DF) Antenna The omni back-mount direction finding (DF) antenna 300 shown in FIG. 4 is a flexible omnidirectional rec eive-only 3-antenna array, used for signal reception and direction finding, mounted atop the case 102 of the control pack 100 (and thus extending up and over the operator's shoulder) and connected to the amplifier section 114 in the case 102. The omni back-mount direction finding (DF) antenna 300 could be supplanted or supplemented by another DF antenna such as an omni head-mount antenna which is mounted on a helmet or in a case attachable to a helmet.

The omni back-mount DF antenna 300 comprises multiple antenna elements which work in combination to provide omni directional detection and reception capability. The DF antenna can be a receiving only antenna or it can integrate transmit antenna elements such as beam steering transmit elements for automatic directional jamming.

The omni back-mount DF antenna 300 is configured with a plurality of antenna elements configured to perform Watson-Watt direction finding. Although various antenna types of Watson-Watt capable antennas are available, an Adcock type is selected and shown in FIG. 4 in part because of its elongate form which extends above the wearer's shoulder for a clear path to the electromagnetic source to enhance direction finding. Inside the elongated portion 304 are multiple antenna elements.

Body-Worn Antenna

The body-worn antenna 500 shown in FIG. 5 is an omnidirectional Rx/Tx antenna worn on the body of the portable ECM device operator and electrically connected to the signal amplifier 114.

The body-worn antenna 500 is suitable for at least L to C band radios. Frequency range is from 2 MHz to 10 GHZ and in an example is 800 MHz to 6000 MHz. Other frequency ranges are possible which provide capability to detect, classify, and interrupt at least L to C band radio signals.

The body-worn antenna 500 comprises an antenna elements enclosure 504 that is panel shaped. The dimensions of the antenna elements enclosure 504 in an embodiment are from 50 mm to 200 mm long, from 50 mm to 200 mm wide, and from 2 mm to 25 mm thick. Weight of the antenna elements enclosure 504 is from 10 gm to 100 gm.

The antenna elements enclosure 504 includes a soft, flexible, and/or waterproof textile covering. The antenna elements enclosure 504 is comfortably thin and flexible to conform to the wearer's clothes or body.

The body-worn antenna 500 comprises an antenna cable 502 electrically attached to an antenna element 506 within the antenna elements enclosure 504. A free end of the antenna cable comprises a free-end connector of type SMA, TNC, N-type, BNC, UHF, QMA, MCX, SSMA, or SMB. The free-end connector electrically connects the antenna element 504 to the antenna connector 110 on the case 102 of the control pack 100.

The pattern of the body-worn antenna 500 is near omnidirectional in azimuth. Polarization is vertical with respect to the relatively horizontal antenna element 504. In an embodiment, gain is from OdBi. VSWR is less than 2:1. The gain is not necessarily from OdBi. The VSWR could be less than 1:1 or 3:1 or other ratio.

The body-worn antenna 500 is suitable detecting and interrupting communications including some or all of: HF, VHF, UHF tactical communications, EW, ISR, JTRS, Rifleman Radio, TETRA, EPLRS, 5G, LTE/4G, Public Safety LMR, Cellular/GSM, ISM, UAV Video Receiver, GPS L1/L2 Passive, Federal L-band, GPS L1-Active, Iridium, Federal S-band, Wi-Fi, Dual band Wi-Fi, UWB, UWB Enhanced Gain, and C band Communications, and analogous radio-frequency communication standards used by other countries.

Tool-Mounted Antenna

The tool-mounted antenna 700 is a directional Rx/Tx antenna configured to be mounted on a tool to direct the tool-mounted antenna at a target. The target could be a person using a cell phone, a building or car radiating cell phone or other electromagnetic waves, an explosive device operated by a cell phone call or radio signal call, or other object or person who might interfere with a soldier or policeman's duties, or harm them or people around them.

The tool-mounted antenna 700 is configured to attach to a tool such as a flashlight barrel, a gun barrel or gun stock, a laser pointer barrel or handle, a tripod, or any other tool convenient for pointing the tool-mounted antenna at the target.

The tool-mounted antenna 700 comprises an antenna cable to connect it electrically to the amplifier section 114 via connection to the connector 112 on the case 102. The antenna cable provides power to the antenna. Alternatively or in addition the tool-mounted antenna 700 comprises a wireless communicator such as Bluetooth to make a wireless connection to the amplifier section so that the tool (e.g. gun or tripod other direction pointing tool) does not have to be connected by an antenna wire to the soldier or policeman wearing the case 102.

In some embodiments the tool-mounted antenna is configured to draw power from a battery in the tool, such as for example a flashlight battery or gun night scope battery, to operate the antenna and power signal transmission from the antenna wirelessly to the amplifier section 114. In some embodiments the tool mounted antenna 700 incorporates a battery, mode selector switch, and/or electronic circuits to wirelessly communicate with the amplifier section and be controlled by the microcomputer.

The tool-mounted antenna 700 comprises a custom designed heliacal or cross-polarized horn with one or more elements. It operates over a broad frequency range and is applicable to 2G, 3G, 4G, 5G and/or Wi-Fi 2.4 GHz and/or 5.8 GHz and/or GPS, HDTV, SDR, UWB, Radar, or LoRa.

In one example the dimensions of tool-mounted antenna 700 are 150 mm to 250 mm wide, 130 mm to 240 mm long, and 2 mm to 20 mm thick.

Mode Selector

The manipulatable mode selector 122 is a manipulatable device on an external part of the case and/or tool-mount antenna 102 as shown in FIGS. 1, 2 and 3.

The portable ECM device is designed to be operated with just the body-worn omni antennas 500 plugged in to the control pack 100, or with the omni back-mount direction-finding antenna array 300 and/or the tool-mounted directional antenna 700 plugged in as well. This requires the integration of a custom amplifier board capable of switching the antenna feeds that are connected to the SDR Rx and Tx ports, and feeding input and output appropriately, depending on the position of the mode selector 122.

Up to seven modes can be selected individually or in combination by the manipulatable mode selector 122 on the case 102. There are three modes plus 'off' to operate the tool-mounted antenna 700. There are four modes plus 'off' to operate the control pack 100. In one embodiment the mode selector 122 is configured to have five positions including one for a dedicated direction-finding mode.

In a seven-mode embodiment, the modes are:

1. Listen/Detect: Passively collects and classifies 800 MHz-6 GHz signals via shoulder-worn or body worn omnidirectional antennas 500;
2. Direction-Finding: Passively collects and classifies 20 MHz-6 GHz signals while estimating signal angle of arrival via Direction Finding antennas 300 which are shoulder worn or head worn;
3. Reactive: Collects, classifies, and automatically replays/jams collected 800 MHz-6 GHz signals via shoulder-worn or body worn omnidirectional antennas 500;
4. Active: Constantly emits user-configurable 800 MHz-6 GHz waveform via shoulder-worn omnidirectional antennas;
5. Directional Listen: Passively collects and classifies 800 MHz-6 GHz signals via long-range rifle-mounted directional antenna 700
6. Directional Reactive: Collects, classifies, and automatically replays/jams collected 800 MHz-6 GHz signals via long-range rifle-mounted directional antenna 700
7. Directional Attack: Constantly emits user-configurable 800 MHz-6 GHz waveform via long-range rifle-mounted directional antenna 700

Modes 5, 6, and 7 are selected by a finger operate-able switch on the directional antenna 700.

Duration of the portable ECM device varies with the mode selected. For example, passive only: 36 hours; auto-protect: 6 to 36 hours (activity dependent); maximum jamming: 1.5 hours. These times are for guidance and may differ by an hour or several hours. Range of the portable ECM device varies with the mode selected because certain modes operate certain antennas. For example, omni detect/collect 2 Km; omni protect 100 m; directional detect/collect 5 Km; and directional attack 2 Km.

Micro-Computer (Micro-Controller) Board

Within the case 102 of the control pack 100 is a micro-computer board 116. This is a mainboard, or motherboard, or system-on-a-chip, interconnected directly or indirectly with the antennas 300, 500, 700, and an RF transceiver 120, and a signal amplifier 114, and a mode selector knob 122.

The microcomputer board 116 comprises a signal processor and a programmable memory. The signal processor is configured to analyze amplified antenna signals from the antennas 300, 500,700. The microcomputer board 116 is configured to generate signals to be broadcast and transmit the signals to be broadcast to the signal amplifier 114. The amplified signals are transmitted by the signal amplifier 114 through an antenna connector 106, 108, 110 to be sent to an antenna 300, 500, 700.

The micro-computer board 116 is configured to route a signal received from a particular one of the antennas 300, 500, 700 to the signal amplifier 114. The signal processor 116 is configured to activate switches to route to the signal processor a selected amplified signal from the amplifier. This enables the signal processor 116 to receive an amplified and filtered signal from a particular one of the antennas 300, 500, 700. The signal processor 116 may operate switches to receive or transmit to/from more than one antenna simultaneously.

The signal processor 116 is configured to activate switches which route an amplified signal from the signal amplifier 114 to a selected one of the antenna connectors 106, 108, 110. The signal processor 116 is configured to activate switches which route a selected signal from the signal processor 116 to the signal amplifier 114. This enables the signal processor 116 to transmit a signal through the signal amplifier 114 and then the amplified signal is routed to a particular one of the antennas 300, 500, 700 for broadcast.

The signal processor 116 comprises a mainboard, motherboard, or system-on-a-chip. It includes memory, an interface such as HDMI, I/O such as Ethernet, USB, and/or Micro HDMI, and is designed for fan-less operation between at least −20 C and 70 C.

Radio Board

As shown in FIG. 3, within the case 102 of the control pack 100 is a radio board 120 which is directly connected to the motherboard 116. The radio board 120 is an integrated-radio transceiver and FPGA that enables transmission and reception of a wide variety of waveforms. The radio board 120 is operable via software running on the microcomputer.

The radio transceiver 120 includes an embedded software defined radio transceiver. The radio transceiver 120 comprises an interface connection to the signal processor 116. Together the radio transceiver 120 and the signal processor 116 provide RF processing. The radio transceiver comprises at least two receivers which are phase coherent receivers, or one receiver and one transmitter, or two receivers and two transmitters, or more pairs of receivers and transmitters In one example the radio transceiver supports tuning in a range of from at least 70 MHz to 6 GHz with up to 50 MHz per channel Other examples with other frequency ranges are possible. Other examples with other and/or newer software radios are possible.

In one embodiment the radio transceiver 120 has a mini PCIe form factor with a PCIe generation 1.1 interface. The radio transceiver 120 supports two RF front end operating modes: either two phase coherent RF receivers (common LO) or one RF receiver+one RF transmitter (separate LOs).

Amplifier Board

Within the case 102 of the control pack 100 there is an amplifier board 114 shown in FIG. 3.

The amplifier board 114 integrates amplifiers, switches, filters, and other related components, which amplifies and routes RF feeds to/from the radio board to/from the portable ECM device's various antennas 300, 500, 700 depending on which mode is selected. The omni back-mount direction-finding antenna 300 and the tool-mounted directional antenna 700, as well as the body-worn omni antenna 500 can all be plugged into the antenna connectors 108, 110, 112 on the case 102 at the same time. To enable all the antennas 300, 500, 700 to communicate with the amplifier board 114, the following feeds go to/from the amplifier board 114:

1 split Rx/Tx feed to/from the body-worn omni antennas
1 Rx/Tx feed to/from the rifle-mounted directional antenna
1 Rx feed from the direction-finding array's North-South antenna—1 Rx feed from the direction-finding array's East-West antenna
1 Rx feed from the direction-finding array's omni antenna The antenna signal amplifier 114 is electrically connected to at least the first antenna connector 108. The antenna signal amplifier 114 is also electrically connected to the second antenna connector 110 and the third antenna connector 112 if either is present. The antenna signal amplifier 114 is configured to amplify radio signals picked up by the antennas 300, 500, 700. The antenna signal amplifier 114 is also configured to amplify signals sent to the antennas 300, 500, 700 to be broadcast.

System Configuration

In one embodiment the Radio Board 120 only has two Rx feeds, and the omni back-mount DF antenna array 300 has three Rx antennas in it (each with their own feed). One of the Radio Board's 120 Rx feeds (Rx1) is dedicated to the omni back-mount DF antenna array's omni antenna, while the amplifier board 114 is very rapidly alternating between the omni back-mount DF antenna array's North-South antenna and its East-West antenna into the Radio Board's 120 other Rx feed (Rx2). The amplifier board 114 is able to go into "Direction Find' mode, where it flips Rx2 back and forth between antenna feeds upon receiving a command from portable ECM device daemon, the software application running on the Portable ECM Device's 116 system-on-a-chip, sent over the Direct Input Output (DIO) pins to the amplifier board 114.

The different modes drive the amplifier board 114 to switch antenna feeds.

1) In one mode (described as "Listen/Detect" 0053 above) just the two body-worn omni antennas are plugged into the portable ECM device control pack 100 (specifically, into its amplifier board 114). The two body-worn omni antennas are the omni antenna in the omni back mount direction finding (DF) antenna 300 and the omni body worn antenna 500. The amplifier board 114 splits and amplifies one Tx signal to both omni antennas while filtering, amplifying, and passing the strongest Rx signal from both antennas to one Radio Board 120 input feed. This only uses 1 Rx/Tx pair of the Radio Board's 2×2 MIMO capability, and is the simplest configuration: 1 Rx/Tx feed to/from the body-worn omni antennas 1.1) In a mode the portable ECM device switches from receiving to transmitting. The user switches the mode knob 122 from Listen to Active, or when in Reactive mode switches between collecting and replaying a potentially modified variant of what it just collected, such as modified replay attacks where specific aspects of received waveforms are adjusted, varied, or modified for playback. The amplifier board 114 switches the amplified antenna feed from the input to the output port on the Radio Board 120, and makes sure the output isn't feeding back into the input.

2) In a mode the direction-finding array in the omni back-mount direction finding (DF) antenna 300, and the tool-mounted directional antenna 700, as well as the body-worn omnidirectional antenna in the omni back-mount direction finding (DF) antenna 300 and the omnidirectional body worn antenna 500, are all plugged into the amplifier board 114. Then following feeds go two/from the amplifier board 114:

- 1 Rx/Tx feed to/from the body-worn omni antennas 300, 500, as per above;
- 1 Rx/Tx feed to/from the tool-mounted directional antenna 700;
- 1 Rx feed from the direction-finding array's North-South antenna
- 1 Rx feed from the direction-finding array's East-West antenna in the omni back-mount direction finding (DF) antenna 300; and
- 1 Rx feed from the direction-finding array's omnidirectional antenna in the omni back-mount direction finding (DF) antenna 300.

There are only two Rx and two Tx feeds on the Radio Board 120. So switching is used. There is a limited number of modes predetermined by the selection of the hardware components and their manufacture into the portable ECM device. For example there may be two, three, four, five, or six modes. So the two Rx and two Tx feeds on the Radio Board are arranged to interact accordingly.

One example of how the portable ECM device operates according to the mode selection is given below.

2.1) The mode knob 122 of the portable ECM device is set to Listen while the omni back-mount direction finding (DF) antenna 300300 is plugged in to the control pack 100. The (extremely sensitive) omni antenna in the omni back-mount direction finding (DF) antenna 300 is an input (to Radio Board 120 Rx1). This keeps the Radio Board's 120 Rx2 and Tx2 free for the tool-mounted directional antenna 700, which can then engage its own Listen, Reactive, or Active modes as appropriate.

2.2) The mode knob 122 of the portable ECM device is set to 'Direction Find' while the direction-finding array of the back-mount direction finding antenna 300 is plugged in to engage its direction-finding capability. That involves the amplifier board 114 passing its omni antenna's feed to the Radio Board's 120 Rx1, while rapidly switching the Radio Board's Rx2 between the North-South and East-West antenna feeds of the omni back-mount direction finding (DF) antenna 300 to enable Watson-Watt direction finding. This leaves both of the Radio Board's 120 Tx outs free. So Tx2 could drive the tool-mounted directional antenna 700 in its own Active mode while the mode knob 122 of the portable ECM device is set to 'Direction Find'.

2.3) The mode knob 122 of the portable ECM device is set to 'Reactive' while the direction-finding array 300 is plugged uses its (extremely sensitive) omni antenna as an input (to Radio Board 120 Rx1) but uses the body-worn antenna 500 and the back-mount DF antenna 300 as output (from Tx1), while leaving Rx2 and Tx2 free to drive the tool mounted directional antenna 700 in its own Reactive or Active modes. This is needed when the direction-finding array's 300 omni antenna is Rx only. The direction-finding array's 300 omni antenna could be modified to Tx/Rx to provide bidirectional capability.

2.4) The mode knob 122 on the case 102 of the portable ECM device control pack 100 is set to 'Active' while the direction finding array 300 is plugged in to the control pack 100 just uses the Radio Board's Tx1 to drive the body-worn omnidirectional antennas in the omni back-mount direction finding (DF) antenna 300 and the omni body-worn antenna 500. The north-south and east-west directional antennas in the omni back-mount DF antenna 300 array are not engaged. This leaves Rx2 and Tx2 free to drive the tool-mounted directional antenna in its own Listen, Reactive, or Active modes.

2.5) The tool-mounted directional antenna 700 has a mode knob which is set to anything but Off. Then the portable ECM control pack 100 must be in 'Direction Find' mode. because of the limited number of Rx/Tx ports. When the portable ECM control pack 100 is in Listen, Reactive, or Active modes, though, then the tool-mounted directional antenna 700 can be in its own Listen, Reactive, or Active modes independently.

Within the case 102 of the control pack 100 is a battery 118 electrically connected to provide power to the signal processor 116 and to the signal amplifier 114.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

The invention claimed is:

1. A portable electromagnetic countermeasure (ECM) device for protecting a user from local electromagnetic devices, comprising

- a first antenna to communicate radio signals with a software defined radio (SDR), and
- a control pack having a microprocessor operable by a mode selector to control the SDR according to a mode selected to receive, produce, and classify radio signals wherein said first antenna is a body-worn antenna comprising an omni directional antenna array in a wearable covering to conform to a wearer's clothes or body.

2. A portable electromagnetic countermeasure (ECM) device for protecting a user from local electromagnetic devices, comprising

- a first antenna to communicate radio signals with a software defined radio (SDR),
- a second antenna to communicate radio signals with said SDR, and
- a control pack having a microprocessor operable by a mode selector to control the SDR according to a mode selected to receive, produce, and classify radio signals wherein said second antenna is a back-mount direction finding antenna comprising three antenna elements including an omni directional antenna element, and two directional elements orthogonal to each other.

3. The portable ECM device according to claim 2 wherein said control pack comprises an antenna connector to support at least three antenna elements in a space above a shoulder and beside a head of a user wearing said control pack.

4. The portable ECM device according to claim 2 comprising a third antenna to communicate radio signals with said SDR, wherein said third antenna is a directable tool-mount antenna to direct or receive electromagnetic radiation at/from a target by pointing a tool.

5. The portable ECM device according to claim 4, wherein said third antenna comprises a tool mount to attach to a flashlight, laser pointer, gun, or other pointing tool.

6. The portable ECM device according to claim 4 wherein said third antenna comprises a custom heliacal or cross-polarized designed antenna element and/or a plate like antenna elements.

7. A flashlight, laser pointer, or gun comprising a tool-mount antenna configured to operate with the portable ECM device of claim 1 or 2 by receiving and transmitting radio signals from said SDR, wherein a tool-mount antenna is attached to a barrel to direct electromagnetic radiation in the direction the barrel is pointed.

8. The flashlight, laser pointer, or gun of claim 7 comprising said mode selector.

9. The portable ECM device according to claim 1 or 2 further comprising a plurality of antennas to communicate radio signals with said SDR.

10. The portable ECM device according to claim 1 or 1 wherein said control pack comprises an amplifier board to amplify radio signals received from said SDR and broadcast said radio signals amplified from a plurality of antennas.

11. The portable ECM device of according to claim 1 or 2 wherein said amplifier board enables an omni-directional jamming range of not less than ten meters.

12. The portable ECM device of claim according to claim 1 or 2 comprising a software memory integrated with said microprocessor to store and run a software daemon with a radio signal-capture algorithm enabling a continuous sampling of ambient radio signal emissions.

13. The portable ECM device of claim 12 wherein said software daemon further comprises a radio signal-generation algorithm enabling a replication of a sampled ambient radio signal emission and a broadcast of a relay radio signal emission to match or cancel or modify said sampled ambient radio emission.

* * * * *